(12) United States Patent
Ooya

(10) Patent No.: US 6,685,512 B2
(45) Date of Patent: Feb. 3, 2004

(54) CARD CONNECTOR

(75) Inventor: Masaaki Ooya, Yokohama (JP)

(73) Assignee: Yamaichi Electronics Co., Ltd., Tokyo (JP)

( * ) Notice: Subject to any disclaimer, the term of this patent is extended or adjusted under 35 U.S.C. 154(b) by 50 days.

(21) Appl. No.: 10/046,716

(22) Filed: Jan. 17, 2002

(65) Prior Publication Data

US 2002/0098740 A1 Jul. 25, 2002

(30) Foreign Application Priority Data

Jan. 19, 2001 (JP) .......................................... 2001-012089

(51) Int. Cl.⁷ ............................................... H01R 23/70
(52) U.S. Cl. ...................................... 439/630; 439/862
(58) Field of Search ............................... 439/630, 862, 439/260, 267, 83, 660, 637, 17, 14

(56) References Cited

U.S. PATENT DOCUMENTS

| 1,477,527 A | | 4/1923 | Raettig |
| 3,040,291 A | | 6/1962 | Schweitzer et al. |
| 3,470,522 A | * | 9/1969 | Lawrence ..................... 439/14 |
| 3,530,422 A | * | 9/1970 | Goodman ..................... 439/17 |
| 3,601,774 A | | 8/1971 | Stathos et al. |
| 3,631,381 A | | 12/1971 | Pittman |
| 3,671,917 A | * | 6/1972 | Ammon et al. ........... 439/17 L |
| 3,963,293 A | * | 6/1976 | McKee ..................... 439/17 L |
| 4,017,143 A | * | 4/1977 | Knowles ................. 439/221 R |
| 4,077,694 A | * | 3/1978 | Cobaugh et al. ...... 439/176 MP |
| 4,184,735 A | * | 1/1980 | Ammon et al. .......... 439/217 S |
| 4,274,699 A | * | 6/1981 | Keim ................. 439/176 MP |
| 4,392,705 A | | 7/1983 | Andrews, Jr. et al. |
| 4,507,697 A | | 3/1985 | Ozil et al. |
| 4,734,041 A | | 3/1988 | Bruchmann et al. |
| 5,080,613 A | * | 1/1992 | Orui et al. ..................... 439/660 |
| 5,401,185 A | | 3/1995 | Wang et al. |
| 5,634,819 A | * | 6/1997 | Pan et al. ..................... 439/637 |
| 5,716,221 A | | 2/1998 | Kantner |
| 5,725,385 A | | 3/1998 | Takano et al. |
| 5,904,597 A | | 5/1999 | Doi et al. |
| 5,933,328 A | | 8/1999 | Wallace et al. |

(List continued on next page.)

FOREIGN PATENT DOCUMENTS

| JP | 47-41714 | 10/1972 |
| JP | 50-56987 | 9/1975 |
| JP | 61-118980 | 6/1986 |
| JP | 04-249082 | 9/1992 |
| JP | 06-036834 | 2/1994 |
| JP | 6-77178 | 10/1994 |
| JP | 8-236187 | 9/1996 |
| JP | 09-027367 | 1/1997 |
| JP | 11-111402 | 4/1999 |
| JP | 2000-502490 | 2/2000 |
| JP | 2000-251024 | 9/2000 |
| JP | 2000-251025 | 9/2000 |
| JP | 2002-117945 | 4/2002 |
| JP | 2002-124343 | 4/2002 |

OTHER PUBLICATIONS

U.S. patent application Ser. No. 09/840,109, Nishimura, filed Apr. 24, 2001.
U.S. patent application Ser. No. 09/842,083, Nishimura, filed Apr. 26, 2001.
U.S. patent application Ser. No. 09/922,866, Ito et al., filed Aug. 7, 2001.

(List continued on next page.)

*Primary Examiner*—P. Austin Bradley
*Assistant Examiner*—Phuongchi Nguyen
(74) *Attorney, Agent, or Firm*—Finnegan, Henderson, Farabow, Garrett & Dunner, LLP

(57) ABSTRACT

A spring piece section of the contact terminal is split into a plurality of spring piece units; each the split spring piece unit having a bending position not coinciding with that of the other, and a pressed portion against which is pressed a portion of the spring piece unit extending from the bending position to the fixing section is arranged in the connector housing.

9 Claims, 11 Drawing Sheets

U.S. PATENT DOCUMENTS

| | | | |
|---|---|---|---|
| 5,993,261 A | 11/1999 | Klatt et al. | |
| 6,004,155 A | 12/1999 | Wu | |
| 6,036,548 A | 3/2000 | Braithwaite | |
| 6,099,335 A | 8/2000 | Chang | |
| 6,102,715 A | 8/2000 | Centofante | |
| 6,162,075 A | 12/2000 | Hara et al. | 439/159 |
| 6,162,089 A | 12/2000 | Costello et al. | |
| 6,174,198 B1 | 1/2001 | Wu et al. | |
| 6,176,737 B1 | 1/2001 | Choy | |
| 6,183,292 B1 | 2/2001 | Chen et al. | |
| 6,250,965 B1 | 6/2001 | Neifer | |
| 6,261,128 B1 | 7/2001 | Heim et al. | |
| 6,315,615 B1 | 11/2001 | Raistrick | |
| 6,315,621 B1 * | 11/2001 | Natori et al. | 439/862 |
| 6,328,605 B1 | 12/2001 | Walker et al. | |
| 6,402,529 B2 | 6/2002 | Saito et al. | |
| 6,409,546 B1 | 6/2002 | Ito et al. | |
| 6,527,590 B2 * | 3/2003 | Oguchi | 439/630 |

OTHER PUBLICATIONS

U.S. patent application Ser. No. 09/978,664, Sato, filed Oct. 18, 2001.

U.S. patent application Ser. No. 10/057,944, Mithuhashi et al., filed Jan. 29, 2002.

U.S. patent application Ser. No. 10/067,891, Ito et al., filed Feb. 8, 2002.

U.S. patent application Ser. No. 10/090,800, Takeyama et al., filed Mar. 3, 2002.

Japanese Office Action and English Translation dated Jan. 21, 2003.

Japanese Office Action dated Jan. 24, 2003 and English Translation.

* cited by examiner

CARD CONNECTOR

This application is based on Patent Application No. 2001-012089 filed Jan. 19, 2001 in Japan, the content of which is incorporated hereinto by reference.

BACKGROUND OF THE INVENTION

1. Field of the Invention

The present invention relates to a card connector to be attached to an electronic equipment such as a cellular phone, a telephone, a PDA (personal digital assistance), a portable audio or a camera, and an elastic contact piece built-in in the card connector. More specifically, it relates to a contacting structure thereof improved in impact-resistance and vibration-resistance to be free from instantaneous electric break.

2. Description of the Related Art

In an electronic equipment such as a cellular phone, a telephone, PDA or a digital camera, various capabilities can be extended by inserting an IC card such as an SIM (subscriber identity module, a trade mark) card, an MMC (multi-media card, a trade mark), a SMART MEDIA (a trade mark), an SD (secure digital) card or a MEMORY STICK (a trade mark) in which a memory or other control circuit is mounted therein.

In a connector structure for detachably mounting such an IC card onto the electronic equipment, a plurality of contact terminals formed of metallic spring pieces are accommodated in the interior of a connector housing. These contact terminals are respectively brought into contact with a plurality of contact pads formed on a front or back surface of the loaded IC card, whereby an IC in the IC card is electrically connected with the electronic equipment to which the connector is attached.

The plurality of contact pads of the IC card include a power source pad to be connected to an power source line and a plurality of signal pads for inputting and outputting various signals. These pads are connected via the plurality of contact terminals of the card connector to an power source circuit and various signal processing circuits in the electronic equipment.

The card connector used for such a portable and small-sized electronic equipment has a problem in that when the impact or vibration is applied to the card connector with a card being loaded therein, for example, by the fall of the equipment, the contact pad of the card may be apart from the contact terminal of the connector to cause an instantaneous break of electric conduction.

If such an accident occurs during the writing of data from the electronic equipment to a memory of the card, the data now being written may be lost or data stored in the card may be damaged or, in the worst case, there is a possibility in that the memory card itself may be broken.

For instance, when the contact terminal for signal is separated from the contact pad of the card, the continuity of data is cut off. A controller for the card, however, determines that the written data is incorrect and thus discarded the same.

When the contact terminal for an power source is separated from the contact pad of the card, an electricpower supplied to the controller is also disconnected. At that time, the controller for the card is in a state wherein all the processings are impossible. For example, a memory area of the card may be damaged if the written data has the continuity.

To solve such a problem, one may consider increasing a contact pressure of the spring piece constituting the contact terminal so that a force for retaining the card becomes larger. However, the above method is problematic in that since a operative force necessary for inserting/withdrawing the card increases in the same ratio as the contact pressure, the operability of card insertion/withdrawal becomes worse.

In this regard, one of causes of the electric break between the card and the connector due to an impact according to the fall of the electronic equipment or others is vibration and resonance. That is, when the impact is applied to the electronic equipment by the fall of the electronic equipment or others, a housing of the electronic equipment or a printed circuit board accommodated therein bends. The restoration force of printed circuit board or the like cause the interior parts of the equipment to vibrate.

If the frequency of this vibration coincides with a resonance frequency of the spring piece of the contact terminal, the spring piece of the contact terminal more largely vibrates to cause the contact to be separated from the contact pad, whereby the electric contact of the card with the connector may be broken.

SUMMARY OF THE INVENTION

The present invention has been made with reference to the above-mentioned circumstances, and a problem to be solved thereby is to provide a card connector capable of maintaining a proper contact pressure with a card within a limited space and of preventing the instantaneous electric break from occurring due to the impact or vibration.

In one embodiment of the present invention, a card connector is provided, which comprises a plurality of contact terminals, each having a terminal section to be connected to a printed circuit board, a fixing section to be secured to a connector housing and a spring piece section having a contact point section at a distal end thereof and bent to be elastically deformable, for holding an IC card within the connector housing so that, when the IC card is loaded therein, a plurality of contact pads are brought into contact with the contact point sections of the plurality of contact terminals, respectively, arranged in the connector housing, wherein the spring piece section of the contact terminal is split into a plurality of spring piece units, each split spring piece unit having a bending section not coinciding with that of the other, and a pressed portion against which is pressed a portion of the spring piece unit extending to the fixing section from the bending section in the split spring piece unit is arranged in the connector housing.

According to the present invention, since the spring piece section of the contact terminal is split into a plurality of spring piece units, wherein each split spring piece unit has a bending section not coinciding with that of the other, and a pressed portion against which is pressed a portion of the spring piece unit extending to the fixing section from the bending section in the spring piece unit is arranged in the connector housing, lengths of portions of the respective spring piece units functioning as a spring become different from each other, it is possible to differentiate a mass, a spring constant and a contact force thereof with the contact pad of the card between the respective split spring piece units. Thus, it is possible to differentiate the resonance frequencies (natural frequencies) of the respective spring piece units from each other.

Since the resonance frequencies of the respective split spring piece units are different from each other in the present invention, even if one of the split spring piece units of the contact terminal resonates due to the vibration of the electronic equipment caused by the fall impact to separate the same from the contact pad of the card, the other of the split spring piece units does not resonate to maintain the contact thereof with the contact pad. In other words, according to the present invention, it is possible to shift the timing at which the respective spring piece unit is separated from the contact pad upon the generation of impact or vibration.

Thus, even if a large impact or vibration is applied, the card inserted into the card connector can be maintained in a stable state free from the instantaneous electric break, whereby the possibility of loss of written data and stored data can be minimized.

Further, in the present invention, since each split spring piece unit has a bending section not coinciding with that of the other, and a pressed portion against which is pressed a portion of the spring piece unit extending to the fixing section from the bending section in the spring piece unit is arranged in the connector housing, it is possible to shorten a length of a portion in some of the split spring piece units functioning as a spring and thus increase the spring constant thereof. Accordingly, it is possible to increase the contact pressure of these split spring piece units with the card, whereby even if the connector is small in size, the card can be held with a proper contact pressure.

In the present invention, a width of the contact point section in some of the spring piece units may be larger than that of the spring piece section.

In the present invention, at least one of a mass, a spring constant and a contact force of the respective split spring piece unit with the contact pad of the card may be differentiated from that of the other by changing a width, a length of the split piece unit or a bending angle of the spring piece section.

According to another embodiment of the present invention, a card connector is provided, which comprises a plurality of contact terminals, each having a terminal section to be connected to a printed circuit board, a fixing section to be secured to a connector housing and a spring piece section having a contact point section at a distal end thereof and bent to be elastically deformable, for holding an IC card within the connector housing so that, when the IC card is loaded therein, a plurality of contact pads are brought into contact with the contact point sections of the plurality of contact terminals, respectively, arranged in the connector housing, wherein the spring piece section of the contact terminal is split into a plurality of spring piece units; each split spring piece unit bending so that the bending section is located by the side of the distal end thereof from the fixing section in the spring piece unit, and a pressed portion against which is pressed a portion of one of the plurality of spring piece units extending to the fixing section from the bending section in the spring piece unit is arranged in the connector housing, and a portion of the other spring piece unit extending to the fixing section from the bending section is in a free state.

According to the present invention, since the spring piece section of the contact terminal is split into a plurality of spring piece units, wherein each split spring piece unit bends so that the bending section is located by the side of the distal end thereof from the fixing section, and a pressed portion against which is pressed a portion of one of the plurality of spring piece units extending to the fixing section from the bending section is arranged in the connector housing, and a portion of the other spring piece unit extending to the fixing section from the bending section in the spring piece unit is in a free state, lengths of portions of the respective spring piece units functioning as a spring are different from each other, and it is possible to differentiate a mass, a spring constant and a contact force with the contact pad of the card between the portions of the respective spring piece units functioning as a spring. Thus, the resonance frequencies (natural frequencies) of the respective split spring piece units can be differentiated from each other. Accordingly, since either one of the plurality of spring piece units is always brought into contact with the card even if impact and vibration generate, whereby it is possible to prevent the instantaneous electric break from occurring between the contact terminal and the card.

As described above, according to the inventive card connector, since the spring piece section of the contact terminal is split into a plurality of spring piece units, wherein each split spring piece unit has a bending section not coinciding with that of the other, and a pressed portion against which is pressed a portion of the spring piece unit extending to the fixing section from the bending section is arranged in the connector housing, it is possible to prevent the instantaneous electric break from occurring between the contact terminal and the contact pad of the card when impact or vibration is applied, as well as to readily obtain a proper contact pressure between the contact terminal and the contact pad of the card even if space is limited.

Also, according to the present invention, since the spring piece section of the contact terminal is split into a plurality of spring piece units; each split spring piece unit bending so that the bending section is located by the side of the distal end thereof from the fixing section in the spring piece unit, and a pressed portion against which is pressed a portion of one of the plurality of spring piece units extending to the fixing section from the bending section is arranged in the connector housing, and a portion of the other spring piece unit extending to the fixing section from the bending section is in a free state, it is possible to prevent the instantaneous electric break from occurring between the contact terminal and the contact pad of the card when impact or vibration is applied, as well as to readily obtain a proper contact pressure between the contact terminal and the contact pad of the card even if space is limited.

The above and other objects, effects, features and advantages of the present invention will become more apparent from the following description of embodiments thereof taken in conjunction with the accompanying drawings.

DESCRIPTION OF THE PREFERRED EMBODIMENTS

The embodiments of the present invention will be described in more detail below with reference to the attached drawings.

First Embodiment

Figure 1:
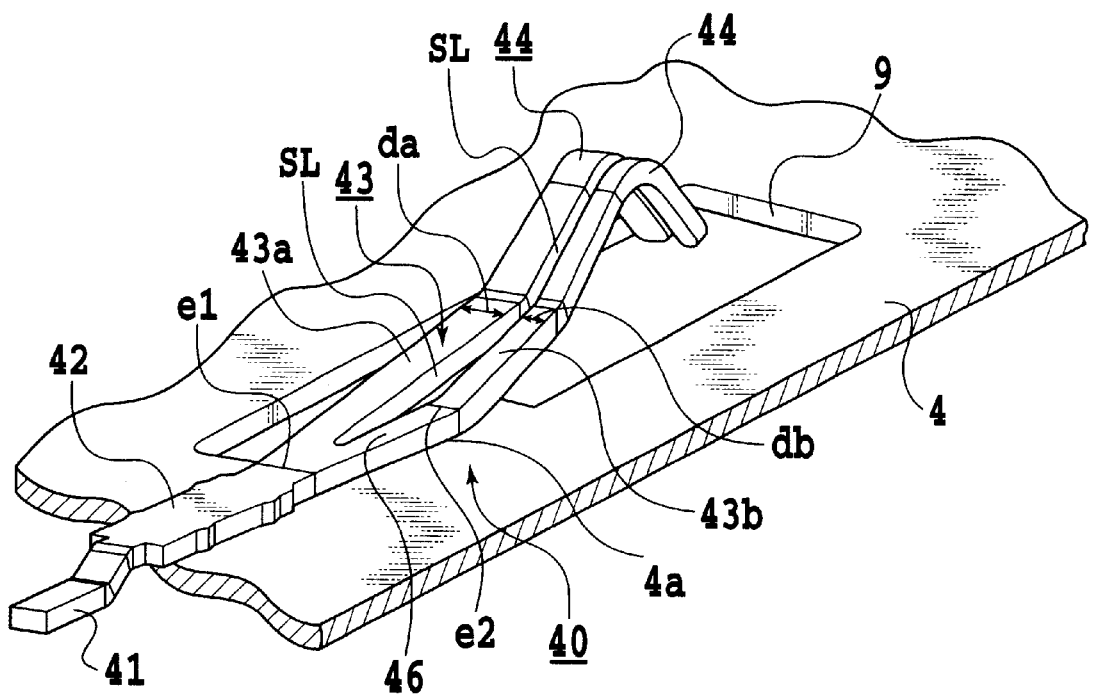
FIG. 1 is a perspective view illustrating main points of a first embodiment of a card connector according to the present invention.

FIG. 1 illustrates main points of the first embodiment according to the present invention wherein the conceptual structure of a contact terminal in close proximity to one contact terminal within a card connector 1 in FIGS. 5 and 6 described later is shown.

As shown in FIG. 1, a contact terminal 40 that is formed of a cantilever-like metallic spring piece, comprises a terminal section 41 to be soldered to a contact pad or others of a printed circuit board of an electronic equipment, a fixing section 42 to be secured to a connector housing, and an elastically deformable spring piece section 43. The spring piece section 43 is bifurcated; that is, split into two units, each having an arcuate contact point 44 protruded upward at a distal end thereof. The two contact points 44 are brought into contact with one contact pad of an IC card inserted into the card connector 1, respectively.

Although not clearly illustrated in FIG. 1, the contact terminal 40 is fixed to the connector housing by press-fitting the fixing section 42 into a press-fit groove 33 (see FIGS. 6 and 7) formed in a bottom plate 4 of the connector housing.

The spring piece section 43 of the contact terminal 40 is split into a plurality of split spring piece units by a cutting line (slit) SL extending in the longitudinal direction (extending direction) of the spring piece section 43 (in this embodiment, the spring piece section 43 is split into two parts; a left spring piece unit 43a and a right spring piece unit 43b).

The respective split spring piece units 43a and 43b are formed of a base material of the same material, plated with the same material and have the same length and thickness. However, they have different widths (da and db). Accordingly, the respective spring piece units 43a, 43b are different in mass or spring constant, whereby it is possible to differentiate resonance frequencies (natural frequencies) of the respective spring piece units 43a, 43b from each other.

Further, in the contact terminal 40 shown in FIG. 1, the respective spring piece units 43a, and 43b are bent at different positions from each other. That is, the left spring piece unit 43a bends at a boundary e1 between the fixing section 42 and the spring piece section 43 to the direction that be away from the surface of the bottom plate 4. On the other hand, the right spring piece unit 43b bends at a section e2 advanced farther from the fixing section 42 toward the distal end to the direction that be away from the surface of the bottom plate 4. In other words, in the right spring piece unit 43b, a non-bending portion 46 which is generally always in contact with the surface of the bottom plate 4 of the housing is provided between the bending section e2 and the fixing section 42.

Figure 2:
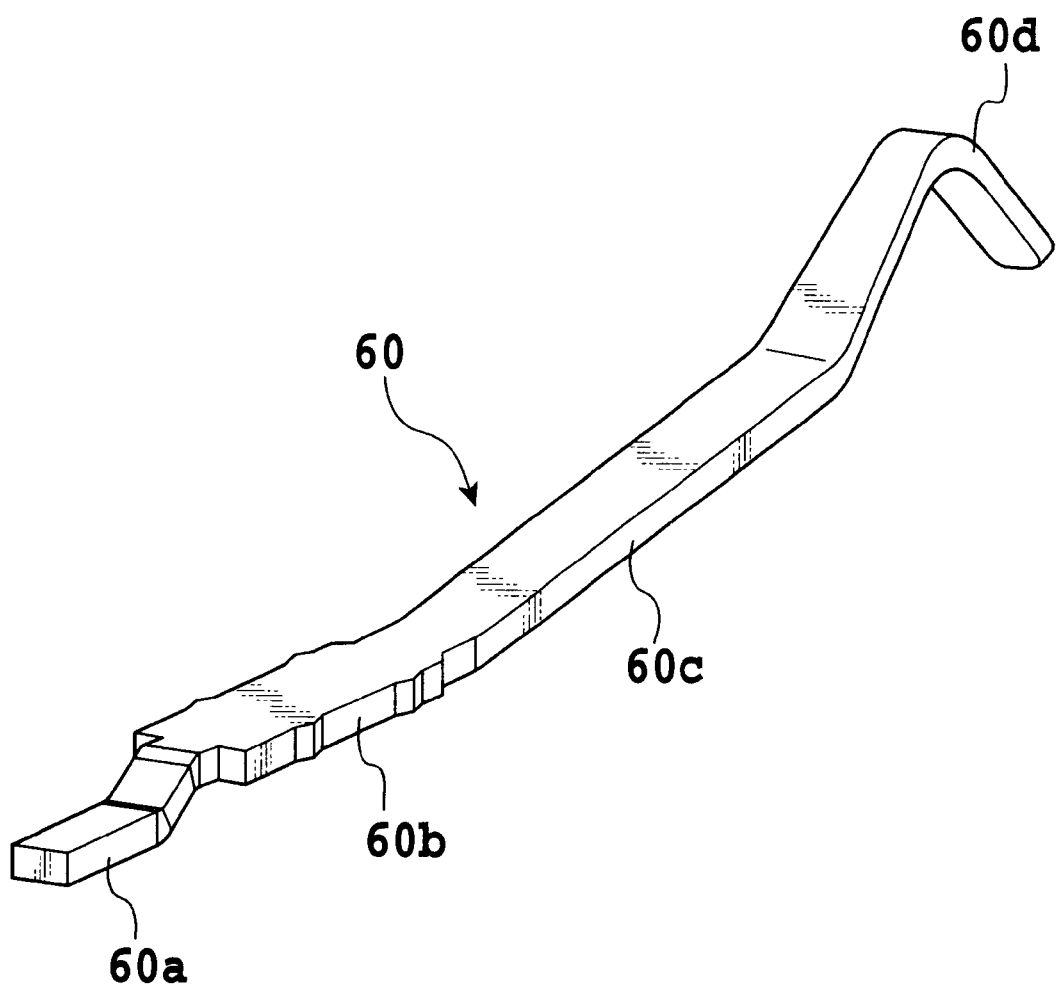
FIG. 2 is a perspective view of a contact terminal used for a conventional card connector.

In this regard, FIG. 2 illustrates an appearance of a conventional contact terminal 60. In FIG. 2, the contact terminal 60 that is formed of an elongate thin plate as a one-piece design, comprises a solder connecting section 60a to be soldered and electrically connected to a printed circuit board of the electronic equipment, a fixing section 60b consecutive to the solder connecting section 60a to be secured to a housing of a card connector, a contact point section 60d to be in contact with an electrode pad of a card loaded to a card connector, and a spring piece section 60c having elasticity for connecting the fixing section 60b with the contact point section 60d. A width of the spring piece section 60c is the same as a width of a boundary between the fixing section 60b and the contact point section 60d. Accordingly, the conventional contact terminal 60 has no slit in the spring piece section 60c for bifurcating the latter.

In addition, in FIG. 1, a relief hole 9 is formed in the bottom plate 4 of a lower housing 10, for releasing a distal end of the contact point section 44 of the contact terminal 40 not to interfere with the bottom plate 4 of the lower housing 10 when the contact point section 44 is elastically deformed by inserting an IC card.

The relief hole 9 is asymmetrically formed as seen in the right and left directions so that at least a portion of the respective spring piece unit 43a, 43b closer to the fixing section 42 than the bending section e1, e2 is pressed to be in contact with bottom plate 4 of the lower housing 10. That is, in this embodiment, there is no bottom plate 4 beneath the left spring piece unit 43a.

On the other hand, for the right spring piece unit 43b, the relief hole 9 is formed so that there is the bottom plate 4 of the lower housing 10 beneath the non-bending portion 46 between the bending section e2 and the fixing section 42, which functions as a part 4a to be pressed on the non-bending portion 46 of the right spring piece unit 43b.

In the first embodiment, since the respective spring piece units 43a, 43b have widths different from each other as described before, it is possible to differentiate the resonance frequencies of the respective spring piece units 43a, 43b from each other.

Thus, even if one of the contact point sections 44 of the split spring piece units 43a and 43b is resonated with the vibration caused by the impact of the electronic equipment due to the fall thereof to instantaneously separate from the contact pad of the card, the other of the contact point sections 44 of the split spring piece units 43a and 43b is not resonated, whereby the contact of the contact pad with the contact point sections 44 could be maintained.

In other words, according to this card connector, it is possible to shift the timing at which the contact point sections 44 of the split spring piece units 43a, 43b are separated from the contact pads. Therefore, even if the impact or vibration occurs, the contact point section 44 of either of the split spring piece unit 43a or 43b is always brought into contact with the contact pad of the card. Thereby, it is possible to always connect the contact point section 44 of the respective contact terminal 40 with the contact pad in a stable manner without the generation of instantaneous electric break, whereby there is less possibility of the loss of written data or stored data.

Recently, in a card connector of this kind, there is a tendency in that the arrangement pitch of a plurality of contact terminals 40 built-in in the card connector becomes smaller in accordance with the miniaturization of card. Accordingly, a width of the contact terminal naturally becomes narrow. Generally speaking, in the connector of this type, it is designed to obtain a proper deformation and contact pressure by a one-point contact of the contact point section 60d, for example, as shown in FIG. 2. Under such a condition, if the spring piece section of the contact terminal 60 is split into two units as a countermeasure against the instantaneous electric break, the width of the respective unit becomes a half or less, which causes the contact pressure obtained therefrom to be a half or less. This results in an insufficient contact pressure to cause a problem in the contact reliability.

Accordingly, in the first embodiment, to obtain a proper contact pressure even if the width of the respective spring piece unit 43a, 43b is narrow, there is the bottom plate 4 beneath the non-bending portion 46 so that it is possible to press a part of the spring piece unit 43b having a narrower width positioned closer to a proximal end of the latter (the non-bending portion 46) onto the bottom plate 4. Thereby, a length of the spring piece section of the spring piece unit 43b becomes shorter to increase the spring constant thereof. As a result, it is possible to increase the contact pressure of the spring piece unit 43b having a narrower width on a card.

In such a manner, according to the first embodiment, since each of the spring piece sections 43 of the plurality of contact terminals 40 is split into multiple pieces so that the respective split spring piece units 43a, 43b have different widths, and part of one split spring piece unit closer to the proximal end thereof can be press-contact with the bottom plate 4, it is possible to prevent the instantaneous electric break between the contact terminal and the contact pad of the card from occurring when the impact or vibration is applied to the card connector, and to readily obtain a proper contact pressure between the contact terminal and the contact pad of the card.

In this connection, if the contact pressures (contact forces) of the contact point section 44 of the split spring piece units 43a, 43b are different from each other, the resonance frequencies of the split spring piece units 43a, 43b are also different from each other.

The explanation will be made on the variation of resonance frequencies of the respective split spring piece units 43a, 43b in accordance with the change of the contact force.

When the great impact is applied to the electronic equipment in which is built-in the connector, the printed circuit board to which the connector is attached vibrates due to the impact force. A frequency of this vibration is lower at the beginning when the impact is applied and then becomes higher with time. On the other hand, an amplitude of the vibration becomes smaller with time.

Each of the split spring piece units 43a, 43b of the contact terminal has an inherent resonance frequency determined by a mass and a spring constant thereof, and when the frequency of the vibration caused by the impact coincides with the inherent resonance frequency, Each of the split spring piece units 43a, 43b resonates to the vibration. In this regard, when the card is loaded in the connector, the contact point sections 44 of the respective split spring piece units 43a, 43b of the contact terminal 40 are brought into contact with the pad of the card while being made to be elastically deformed. Thereby, the contact point section 44 applies a predetermined contact force (contact pressure) corresponding to an amount of elastic deformation thereof onto the contact pad of the card. It is surmised that the resonance frequencies of the split spring piece units 43a, 43b when the card is loaded vary in accordance with this contact force of the contact point section 44 of the respective split spring piece unit 43a, 43b in comparison with a theoretical resonance frequency in an unloaded state determined by the mass and the spring constant of the respective split spring piece unit 43a, 43b.

Accordingly, even if the split spring piece units 43a, 43b have the same mass and the same spring constant, it is possible to differentiate the contact forces (contact pressure) against the contact pad of the card of the contact point sections 44 in the respective split spring piece units 43a, 43b from each other, for example, by varying a length of the split spring piece units 43a, 43b or a bending angle relative to the fixing section 42. Thereby, it is possible to differentiate the resonance frequencies of the split spring piece units 43a, 43b from each other when the card is loaded in the connector.

According to the first embodiment, the relief hole 9 has a large opening so that the bottom plate 4 of the lower housing 10 exists solely beneath the non-bending portion 46 of the right spring piece unit 43b.

However, since the primary function of the relief hole 9 is to release an elastically deformed portion of the contact point section 44 in the respective spring piece unit 43a, 43b not to interfere with the bottom plate 4, the relief hole may be formed to have a smaller opening so that only the above function is achievable.

That is, in the embodiment shown in FIG. 1, while a part of the bottom plate 4 responding to an area beneath part of the left spring piece unit 43a closer to the proximal end thereof is opened, the bottom plate may be extended to this area since the bottom plate provided at the area beneath the proximal end side of the left spring piece unit 43a does not interfere with the elastic deformation of the spring piece. Also, a size of the relief hole 9 may become much smaller so that a front end portion of the respective spring piece unit 43a, 43b alone is releasable. Further, if the elastically deformed contact point section 44 of the respective spring piece unit 43a, 43b never interferes with the bottom plate 4, the relief hole 9 may be eliminated at all.

Second Embodiment

Figure 3:
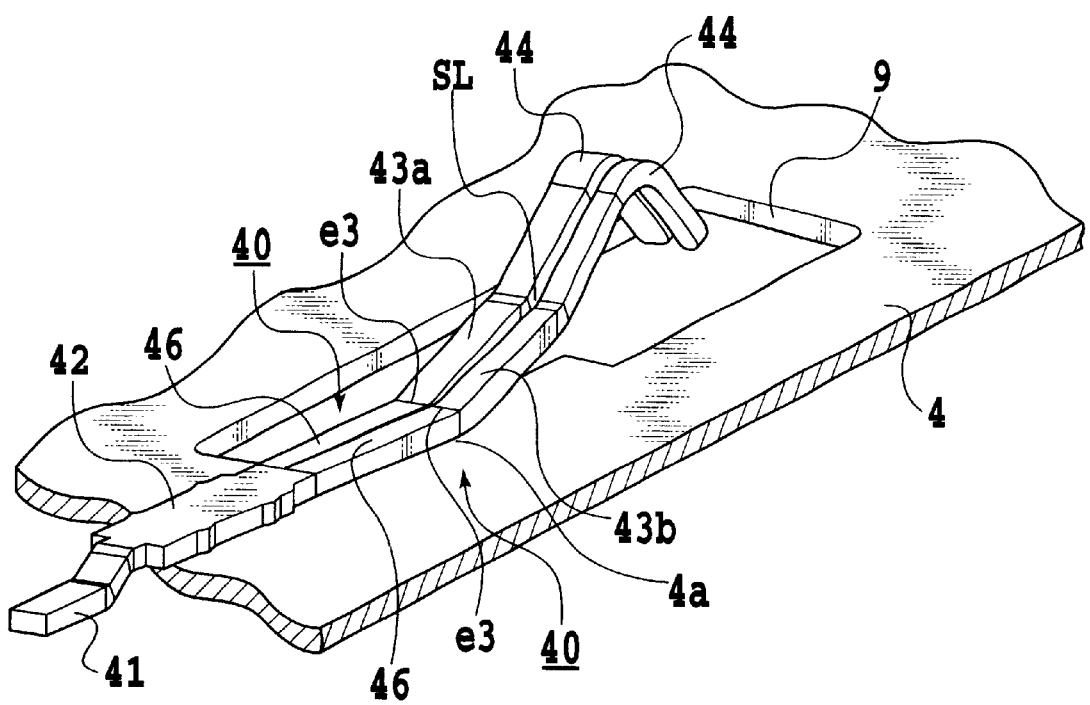
FIG. 3 is a perspective view illustrating main points of a second embodiment of a card connector according to the present invention.

FIG. 3 illustrates a main part of a second embodiment according to the present invention.

Also in the second embodiment, a spring piece section 43 of a contact terminal 40 is bifurcated to form two spring piece units 43a, 43b. A relief hole 9 in a bottom plate 4 is substantially the same as the above-mentioned first embodiment.

Provided that in the second embodiment, the respective spring piece units 43a, 43b are bent at the same bending position e3 which is located apart by a certain distance from an end portion of a fixing section 42 of the contact terminal 40 toward the side of the spring piece units 43a, 43b. Accordingly, in the contact terminal 40 in the second embodiment, non-bending portions 46 exist in both of the spring piece units 43a, 43b.

No bottom plate 4 of a lower housing 10 exists beneath non-bending portions 46 in one of the spring piece units 43a. Accordingly, the non-bending portion 46 of the spring piece unit 43a is in a free state. The bottom plate 4 (4a) of the lower housing 10 exists beneath non-bending portions 46 in the other of the spring piece units 43b.

According to this contact terminal 40, when the respective contact terminal 40 is elastically deformed upon the insertion of a card, a portion of the one spring piece unit 43a extending from an end of the fixing section 42 toward a free end is elastically deformed as a whole, while since a portion of the other spring piece unit 43b extending to the side of the fixing section 42 (non-bending portion 46) from the bending position e3 is brought into contact with the bottom plate 4 of the lower housing 10, a portion extending to a free end from the bending position e3 is solely elastically deformable. Thus, both the units are different in spring length; i.e., in spring constant and mass.

Thereby, both the spring piece units 43a, 43b are different in resonance frequency. Accordingly, it is possible to reliably prevent the instantaneous electric break from occurring between the contact terminal and the contact pad of the card when the impact or vibration is applied, and to readily obtain a proper contact pressure between the contact point section of the contact terminal and the contact pad of the card.

Third Embodiment

FIGS. 4 to 11 illustrate a third embodiment of the present invention.

In the third embodiment described below, the present invention is applied to a connector for a double-thick card called an SD card.

Figure 4:
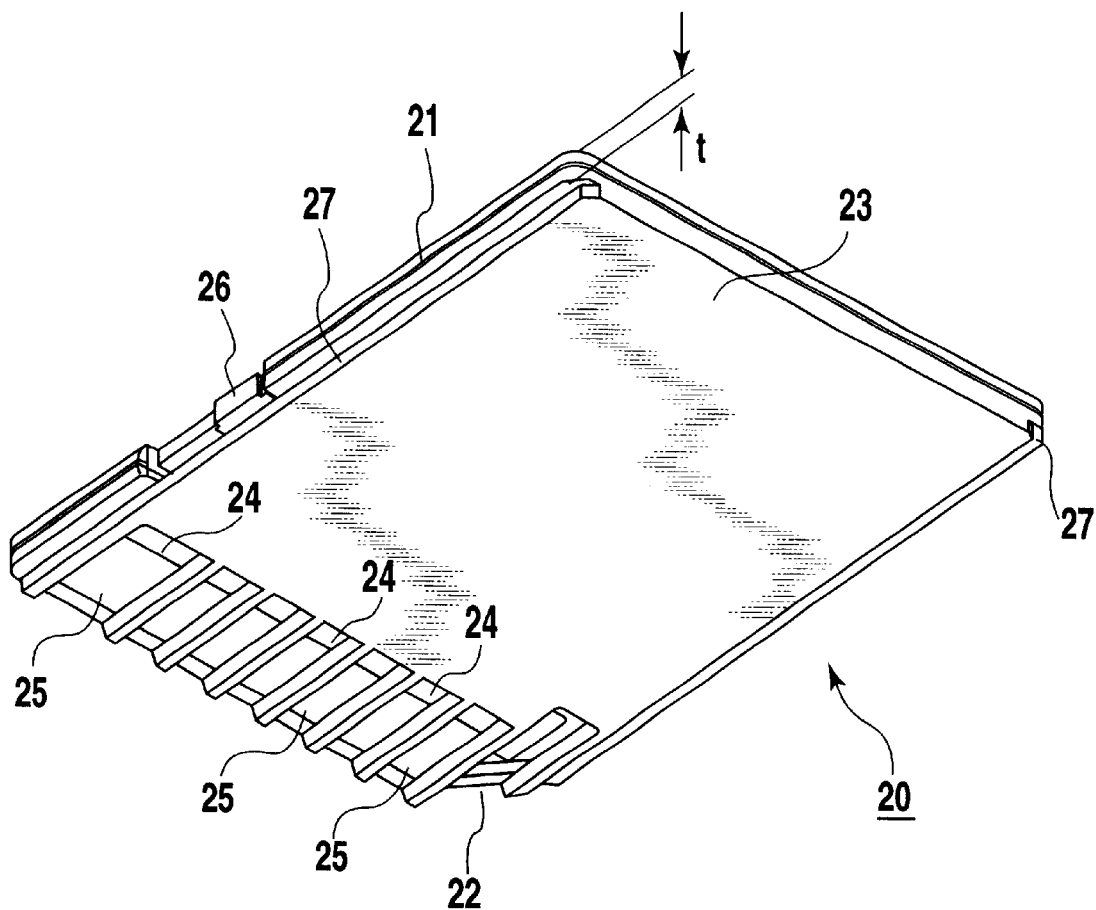
FIG. 4 is a perspective view illustrating an IC card used for a third embodiment of a card connector according to the present invention.

FIG. 4 shows a back surface of the SD card 20 used as an IC card (memory card). This SD card 20 has an upper body 21 t in thickness, and a lower body 23 slightly narrower than the upper body 21. That is, on the opposite sides of the card 20, a step height 27 is formed along the card edge. A generally triangular cut-off 22 is provided at the front corners of one of the upper body 21 for preventing the erroneous insert of the card from occurring.

On the front edge of the lower body 23, a plurality of recesses 24 are formed. Contact pads 25 are arranged in these recesses 24, respectively. A depth of the respective recess 24 is approximately equal to a height of the lower body 23. Accordingly, the surface of the respective contact pad 25 is apart from the front surface of the upper body 21 by a distance corresponding to about the thickness of t of the upper body 21.

The contact pads 25 are of a nine-pin structure including an power source pin and signal pins for data, command, clock or others. On the side of the card 20, there is a write protect button 26.

Figure 5:
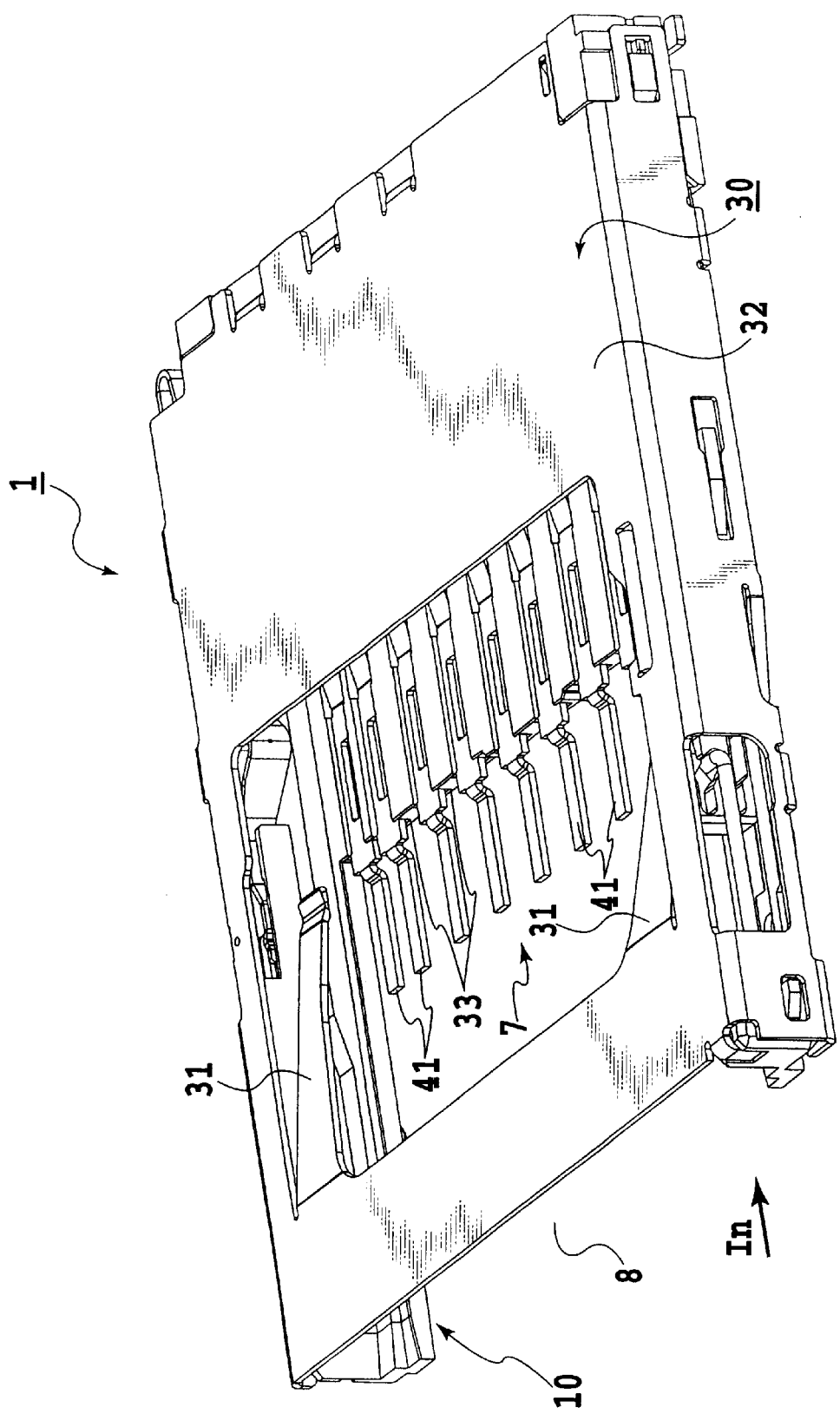
FIG. 5 is a perspective view illustrating a configuration of the third embodiment of a card connector.
Figure 6:
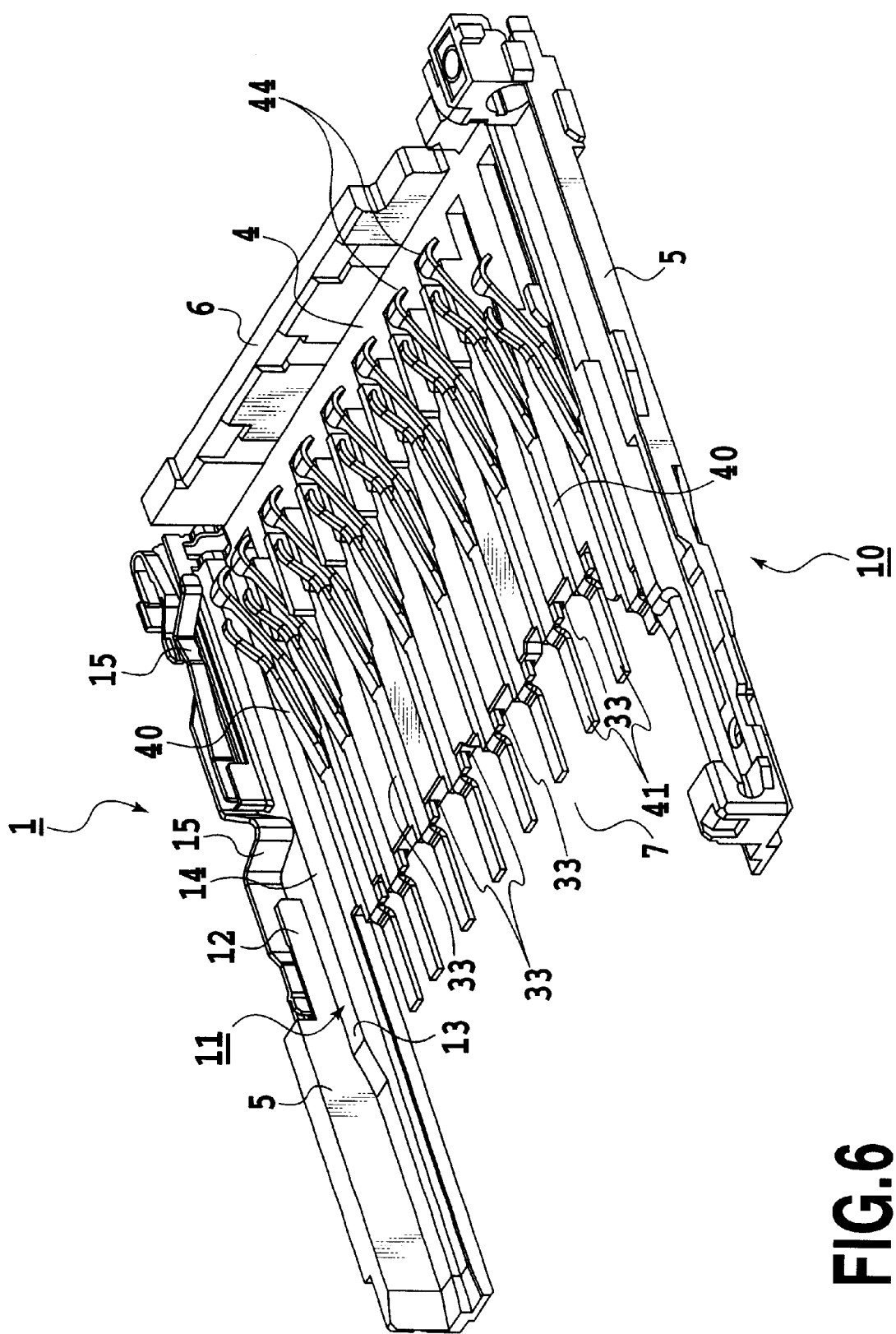
FIG. 6 is a perspective view illustrating the third embodiment of a card connector with an upper housing thereof being removed.
Figure 7:
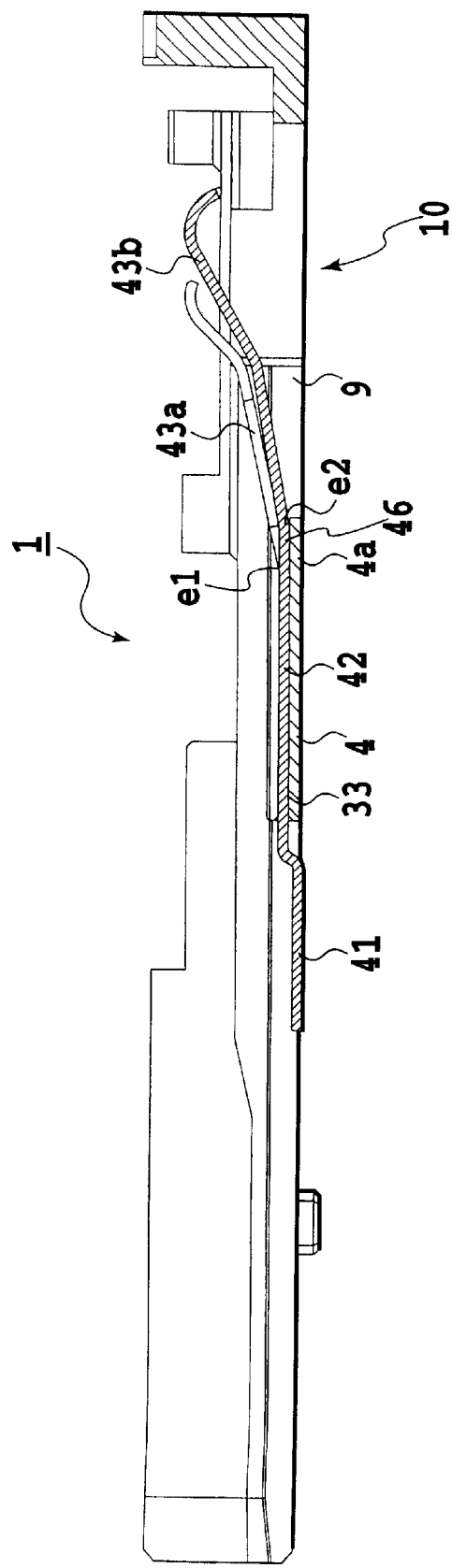
FIG. 7 is a sectional view of the third embodiment of a card connector.
Figure 8:
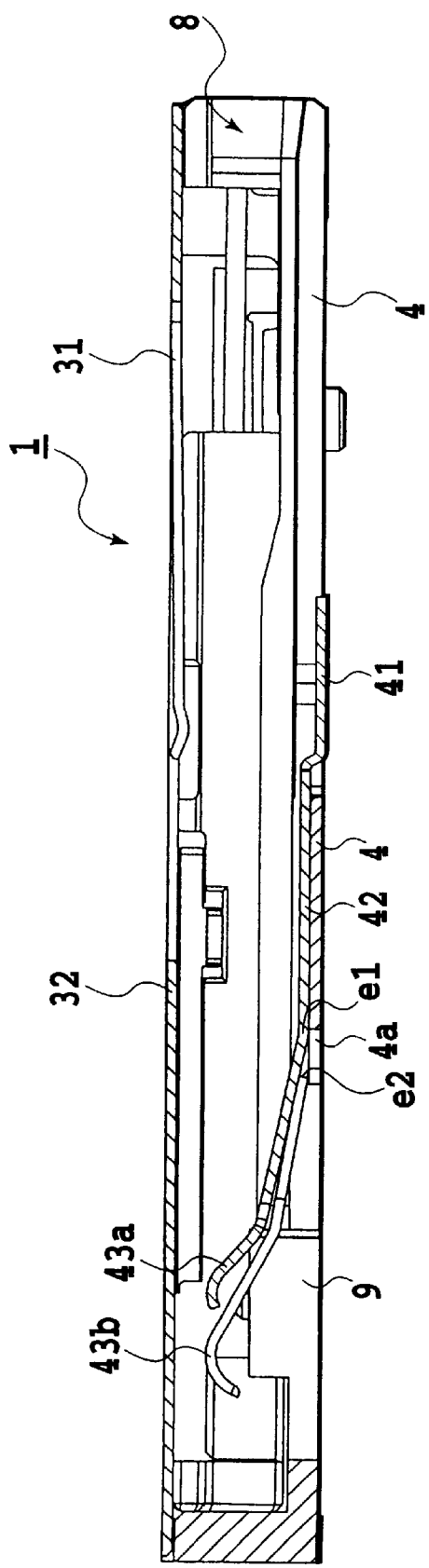
FIG. 8 is another sectional view of the third embodiment of a card connector.
Figure 9:
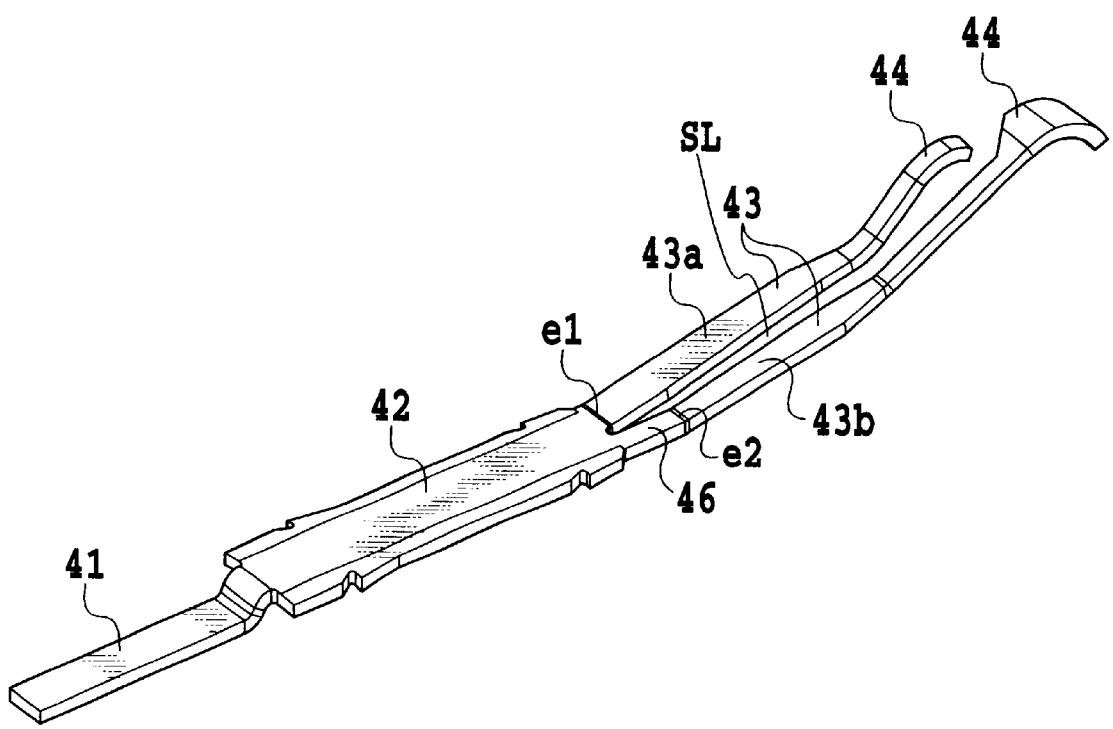
FIG. 9 is an enlarged perspective view of a contact terminal used for the third embodiment of a card connector.
Figure 10:
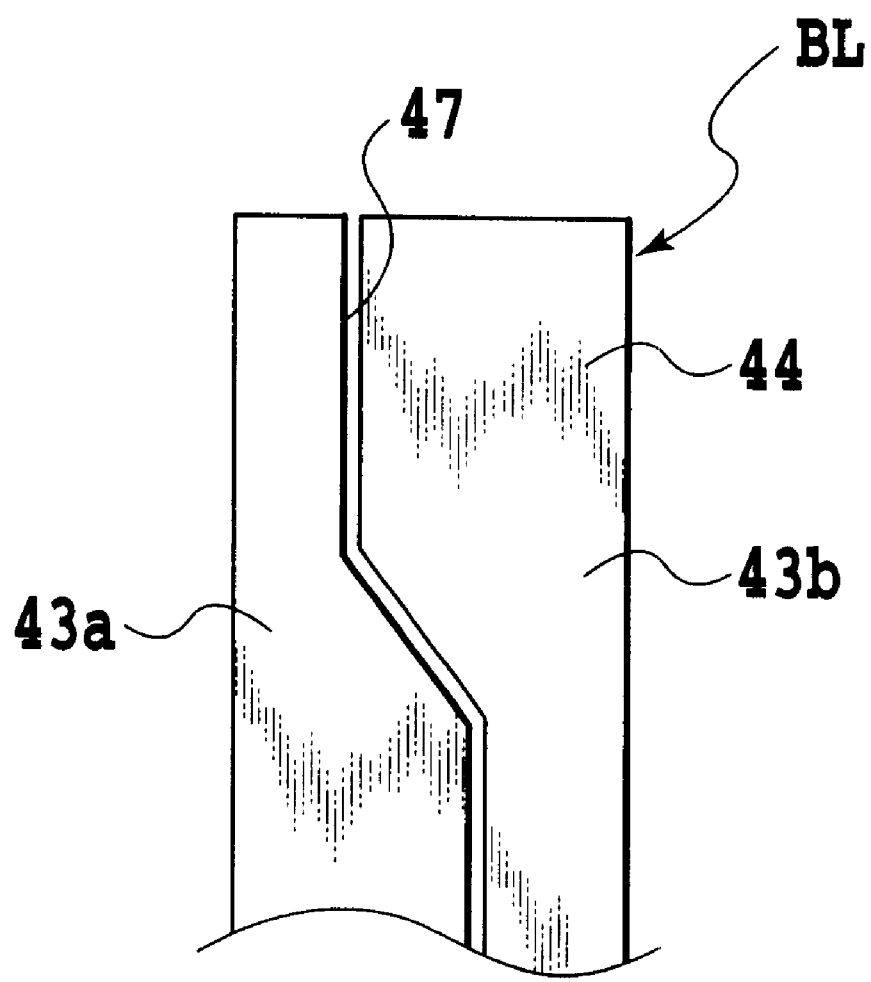
FIG. 10 is a partial plan view of the contact terminal shown in FIG. 9 prior to being subjected to the bending process.
Figure 11:
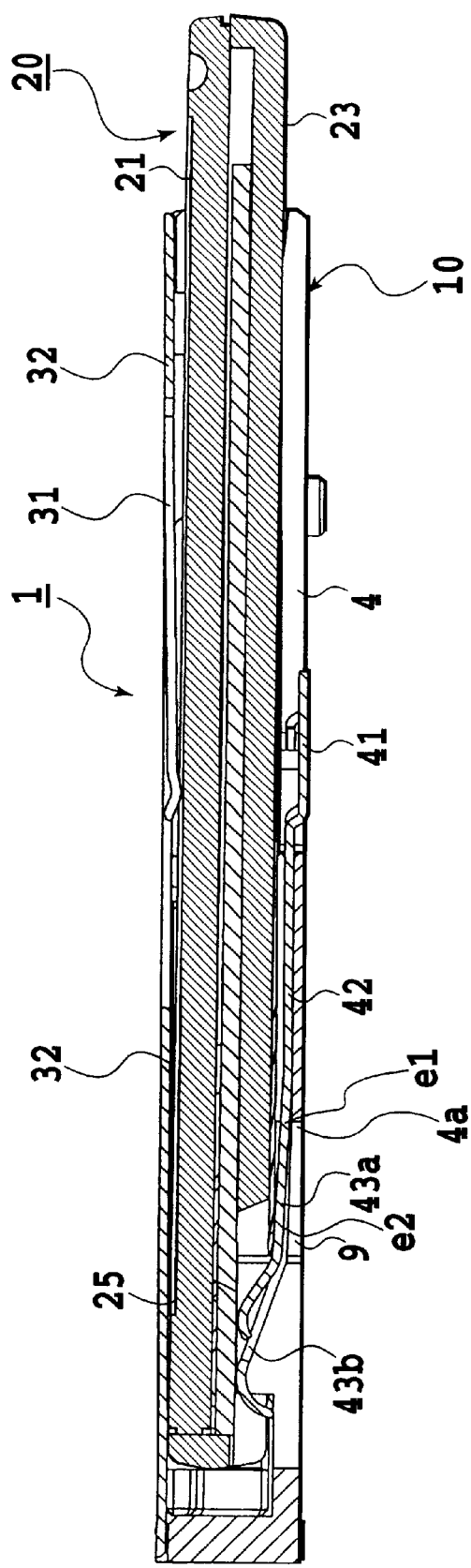
FIG. 11 is a sectional view illustrating the third embodiment of a card connector when a card is loaded therein.

FIGS. 5 to 11 illustrate structures of a card connector 1 for loading the above-mentioned card 20, wherein FIG. 5 is a perspective view illustrating an appearance thereof; FIG. 6 is a perspective view of the card connector with the upper housing (shell) being removed; FIG. 7 is a sectional view of the card connector when the card is unloaded; FIG. 8 is a sectional view of the card connector when the card is loaded; FIG. 9 is an enlarged perspective view of one contact terminal; FIG. 10 is a plan view of one contact terminal prior to being subjected to the bending process; and FIG. 11 is a sectional view of the card connector when the card is loaded.

The card connector 1 shown in these drawings is used for an electronic equipment such as a mobile phone, PDA, a portable audio, a digital camera or others, and the card 20 is loaded in the connector 1 so that a surface on which the contact pads 25 are formed faces downward as shown in FIG. 11. The card connector 1 includes the lower housing 10 and the upper housing (shell body) 30.

The lower housing 10 is made of an insulating material such as resin. The upper housing 30 is formed of metallic sheet by the sheet metal working and functions as a cover for covering the lower housing 10. One of reasons for forming the upper housing 30 with the metallic sheet, not with resin, is that since metal is larger in strength than resin, it is possible to minimize a height of the connector.

In the upper housing 30, a brake piece 31 is formed on a top plate 32 thereof for preventing the card 20 from coming off during the card ejection.

As shown in FIG. 6 or others, the lower housing 10 has a generally U-shaped structure in cross section as defined by the bottom plate 4, left and right lateral plates 5 and a rear plate 6. A card room 7 for accommodating the card therein is defined by the top plate 32 of the upper housing 30, the bottom plate 4, the lateral plates 5 and the rear plate 6 of the lower housing 10. The card 20 is inserted into the housing (the card room 7) through a card inserting opening 8 (FIG. 5) formed in front thereof.

In the left and right lateral plates 5 of the lower housing 10, guide grooves 11 are formed for guiding the insertion and withdrawal of the card 20. The card 20 is inserted and withdrawn along the guide grooves 11 with the surface carrying the contact pads 25 side down. Each of the guide grooves 11 is formed by the top plate 32 of the upper housing 30, a lateral wall 12 and bottom wall 13. Further, a lateral wall 14 is formed to extend downward generally at a right angle from the edge of the respective guide groove 11.

As shown in FIG. 6, in one of the lateral plates 5 of the lower housing 10, a plurality of metallic spring pieces 15 are provided, which constitutes a write protect switch for detecting a slide position of the write protect button 26 of the card 20 or others.

In this embodiment, the illustration and description of an ejection mechanism for ejecting the card 20 will be eliminated.

In the bottom plate 4 of the lower housing 10, a plurality of (nine in this embodiment) grooves 33 are formed for positioning and press-fitting the fixing sections 42 of the respective contact terminals 40. The plurality of grooves 33 are arranged at a predetermined pitch in the widthwise direction of the bottom plate 4.

As shown in FIG. 9, the contact terminal 40 is formed of a cantilever-like metallic spring piece, and has a terminal section 41 to be soldered to a contact pad of a printed circuit board in the electronic equipment, a fixing section 42 for being press-fit into the groove 33 and an elastically deformable spring piece section 43. The spring piece section 43 is bifurcated into two units, each of which has at a distal end thereof an arcuate contact point section 44 protruded upward to be in contact with the contact pad 25 of IC card inserted into the connector. The fixing sections 42 of the plurality of contact terminals 40 are press-fit into the grooves 33 formed in the bottom plate 4 of the housing 10 in the arrowed direction In shown in FIG. 5 i.e. along the card insert direction from a front side of the connector housing.

The spring piece section 43 of the contact terminal 40 is bifurcated into two spring piece units 43a, 43b so that a cut line (slit) SL is formed in the longitudinal direction (extending direction) of the spring piece section 43. In this embodiment, the split spring piece units 43a and 43b are formed of a base material of the same material, plated with the same material and have the same thickness. However, a length, a shape and a bending position thereof are different from each other.

Regarding the length (from a position in the vicinity of the boundary e1 described later to a distal end of the respective spring piece unit 43a, 43b), the left spring piece unit 43a is shorter than the right spring piece unit 43b.

Regarding the shape, a width of a distal end portion of the left spring piece unit 43a is narrower than that of a proximal end portion thereof. Also, a distal end portion (a contact point section) 44 of the right spring piece unit 43b is wider than the spring piece section in the vicinity of the proximal end thereof. Thereby, the difference in mass between both the spring piece units 43a, 43b becomes larger.

Upon forming such a difference in shape between the left and right spring piece units 43a, 43b, a bending slit 47 is formed in a blank BL for the contact terminal in the longitudinal direction, for example, as shown in FIG. 10. Then, the respective spring piece units 43a, 43b are easily formed by bending the slitted blank, during which the contact pressure of the spring piece units is easily adjustable. That is, by adjusting a width of the contact point section 44 of the spring piece unit 43b, the resonance frequency is precisely adjustable.

Regarding the bending position, all is the same as in the first embodiment shown in FIG. 1. That is, the left spring piece unit 43a is bent at the boundary e1 between the fixing section 42 and the unit. While, the right spring piece unit 43b is bent at a section e2 apart from the fixing section 42 toward the distal end.

The relief hole 9 formed in the bottom plate 4 of the lower housing 10 at a position beneath the respective contact terminal 40 has a shape capable of achieving the same function as in the first embodiment shown in FIG. 1. That is, as shown in FIGS. 7, 8 and 11, the relief hole 9 in this embodiment is asymmetrically formed as seen in the right and left directions so that at least a portion of the respective spring piece unit 43a, 43b closer to the side of the fixing section 42 from the bending position e1, e2 is pushed to be in contact with bottom plate 4 of the housing. There is no bottom plate 4 beneath the left spring piece unit 43a.

On the other hand, for the right spring piece unit 43b, the relief hole 9 is formed so that the bottom plate 4 of the housing exists beneath the non-bending portion 46 between the bending section e2 and the fixing section 42 to function as a part 4a to be pressed the non-bending portion 46 of the right spring piece unit 43b.

As described above, in the third embodiment, since the length, the width, the shape and the bending position are different between both the split spring piece units 43a, 43b, and in addition, part of the split spring piece unit 43b closer to the proximal end thereof is capable of being pressed onto the bottom plate 4, both the spring piece units 43a, 43b are different from each other in a mass, a spring constant or a contact force (contact pressure) whereby it is possible to differentiate the resonance frequency (natural frequency) of the spring piece units 43a, 43b. Accordingly, it is possible to prevent the instantaneous electric break due to the impact or vibration from occurring between the contact terminal and the contact pad of the card as well as to readily obtain a proper contact pressure between the contact terminal and the contact pad of the card.

In this regard, when differentiating the contact pressure on the contact point sections 44 of both the spring piece units 43a, 43b from each other, the contact pressure on the contact point section of the one spring piece unit is preferably ⅓ to ⅔ of the contact pressure of the other.

(Modified Embodiment)

According to the present invention, the contact terminal 40 may be split into any number of spring piece units, including three or more. Also, any means may be adopted other than described above to change a mass and a spring constant of the respective split spring piece unit. For instance, the plating material for the split spring piece unit may be changed. Other means may be used for varying the contact force of the contact point section of the split spring piece unit.

In the above embodiments, while the present invention is applied to the contact terminal 40 of a type in which the spring piece section 43 extends in one direction, it may be applied to other types of the contact terminal, for example, in which the spring piece section 43 has a turn-up portion in the midway thereof.

The contact forces of the contact point sections of the respective spring piece units may be changed by varying the bending angles of the spring piece sections relative to the fixing section 42 when no load is applied, so that amounts of the elastic deformation of the contact point section in the spring piece units are different from each other when the card 20 is loaded. Further, other means may be used for changing the contact force. For instance, while the bending angles of the split spring piece units 43a, 43b relative to the fixing section are equal to each other, different materials and/or thicknesses may be adopted for forming the split spring piece units 43a, 43b so that values of the spring constant thereof are different and thereby the contact forces are different from each other.

While the explanation is made on the SD card as a representative example of the IC card 20 in the above embodiments, the present invention may be applicable to a card connector for any other IC cards such as SIM card, MMC card (a trade mark), SMART-MEDIA CARD (a trade mark) or MEMORY STICK (a trade mark). In such a case, a structure of the card connector therefor may be optional provided it matches with the card.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A card connector a plurality of contact terminals, each having a terminal section to be connected to a printed circuit board, a fixing section to be secured to a connector housing and a spring piece section having a contact point section at a distal end thereof and bent to be elastically deformable, for holding an IC card, within said connector housing so that, when said IC card is loaded therein, a plurality of contact pads of said IC card are brought into contact with said contact point sections of said plurality of contact terminals, respectively, arranged in said connector housing, wherein said spring piece section of said contact terminals is split into at least a first and a second spring piece unit, each of said split spring piece units having a bending section provided proximal to said fixing section, said bending section of said second spring piece unit not coinciding with said bending section of said second spring piece unit, said first spring piece unit of each spring piece section having a different width than the width of said second spring piece unit of the same spring piece section.

2. A card connector as defined in claim 1, wherein said pressed portion is disposed on a top plate or bottom plate of said connector housing.

3. A card connector as defined in claim 1, wherein a width of said contact point section in some of said spring piece units is larger than a width of said spring piece section.

4. A card connector as defined in claim 1, including a surface in said connector housing against which is pressed a portion of at least one of said spring piece units, extending to a side of said fixing section from said bending section.

5. A card connector as defined in claim 1, wherein in each of said split spring piece units, at least one of a mass, a spring constant and a contact force with said contact pad of said card is different from those of the other split spring piece units.

6. A card connector as defined in claim 5, wherein a length of each said split spring piece unit is different from that of the other.

7. A card connector as defined in claim 5, wherein a bending angle of said spring piece section relative to said fixing section in each said split spring piece unit without a load is different of that of the other.

8. A card connector comprising a plurality of contact terminals, each having a terminal section to be connected to a printed circuit board, a fixing section to be secured to a connector housing and a spring piece section having a contact point section at a distal end thereof and bent to be elastically deformable, for holding an IC card within said connector housing so that, when said IC card is loaded therein, a plurality of contact pads are brought into contact with said contact point sections of the plurality of contact terminals, respectively, arranged in said connector housing, wherein said spring piece section of said contact terminal is split into a plurality of spring piece units, each said split spring piece unit bending so that a bending section is located by a side of said distal end thereof from said fixing portion in said split spring piece unit, and a surface in said connector housing against which is pressed a portion of one of the plurality of spring piece units extending to said fixing section from said bending section in said spring piece unit, and a portion of the other spring piece unit extending to said fixing section from said bending section is in a free state.

9. A card connector as defined in claim 8, wherein said pressed portion is disposed on a top plate or bottom plate of said connector housing.

* * * * *

UNITED STATES PATENT AND TRADEMARK OFFICE
CERTIFICATE OF CORRECTION

PATENT NO.     : 6,685,512 B2
DATED          : February 3, 2004
INVENTOR(S)    : Masaaki Ooya It is certified that error appears in the above-identified patent and that said Letters Patent is hereby corrected as shown below:

Column 12,
Line 22, "connector a" should read -- connector comprising a --.

Signed and Sealed this

Thirteenth Day of April, 2004

JON W. DUDAS
*Acting Director of the United States Patent and Trademark Office*